United States Patent [19]
Härlin

[11] 3,872,595
[45] Mar. 25, 1975

[54] TRACING APPARATUS FOR A NON-CIRCULAR TEMPLATE

[76] Inventor: Herbert Härlin, 7533 Eutingen Baden, Germany

[22] Filed: Apr. 17, 1973

[21] Appl. No.: 351,958

Related U.S. Application Data
[63] Continuation of Ser. No. 38,705, May 19, 1970, abandoned.

[52] U.S. Cl.................. 33/23 H, 33/27 K, 33/25 R
[51] Int. Cl............................................. B43l 13/10
[58] Field of Search...... 33/24 R, 24 C, 23 R, 23 H, 33/23 K, 27 K, 28, 25 R

[56] References Cited
UNITED STATES PATENTS
2,035,581   3/1936   Williams............................. 33/27 K FOREIGN PATENTS OR APPLICATIONS
1,051,677   2/1959   Germany................................ 33/28

*Primary Examiner*—Harry N. Haroian
*Attorney, Agent, or Firm*—Michael S. Striker

[57] ABSTRACT

A first tracing means, either a slide or a rotary arm, or a wheel means rolling along endless control tracks, moves along a predetermined endless path whose outline corresponds substantially to the non-circular track of a template, which deviates from the outline of the endless path. A biased tracing slide or tracing lever is mounted on the first tracking means and has a follower engaging the track of the template and moving along the same. A guided arm is articulated to the follower and controls a tool or workpiece to move parallel to the track of the template.

8 Claims, 10 Drawing Figures

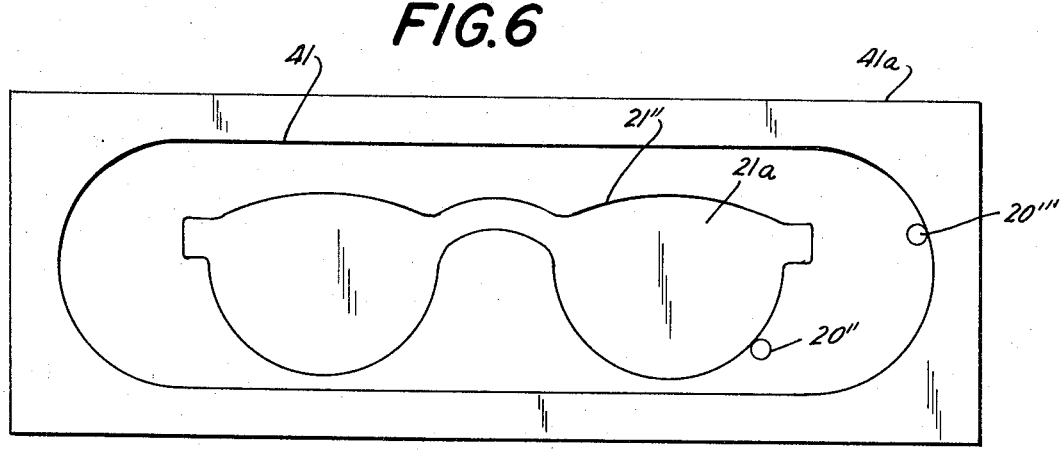
FIG.6
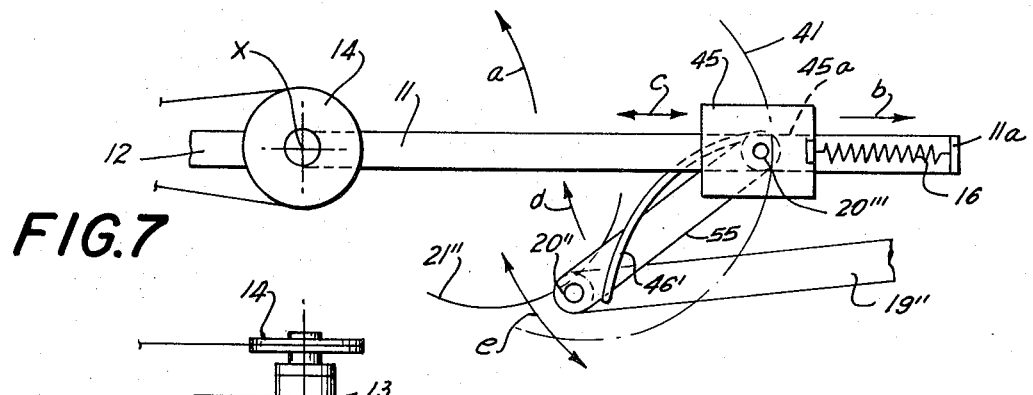
FIG.7
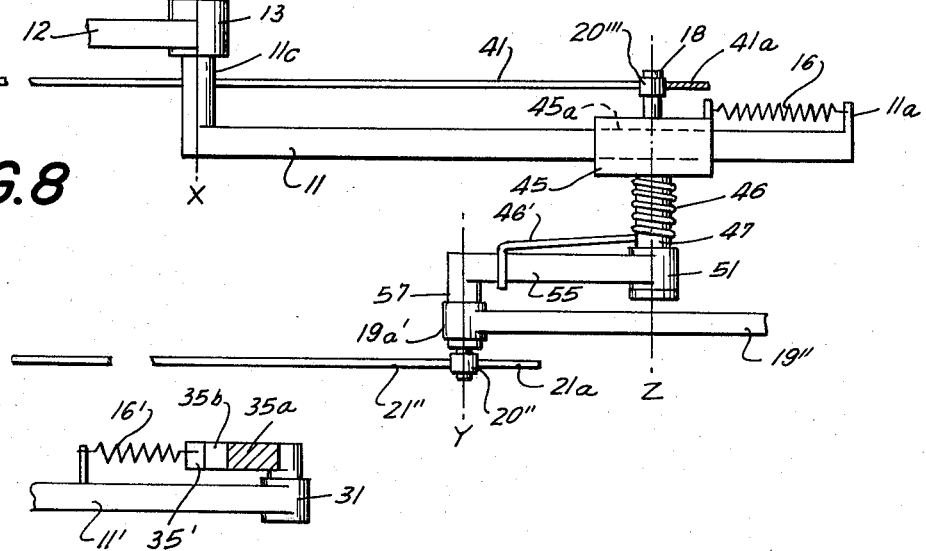
FIG.8
FIG.5

PATENTED MAR 25 1975

TRACING APPARATUS FOR A NON-CIRCULAR TEMPLATE

The present application is a continuation application of my copending application Ser. No. 38,705, filed May 19, 1970, and entitled "Tracing Apparatus For A Noncircular Template, now abandoned."

BACKGROUND OF THE INVENTION

It is known to provide automatic machine tools with a power driven tracing apparatus which traces the endless track of a template over an angle of over 360°. In accordance with the prior art, two independent tracing means are used, which successively trace half of the track of the endless template. The tracing means, which have a follower roller moving along the track of the template, are usually operated by pneumatic means, and directly guide a control means, such as a pantograph, controlling a workpiece or tool. The tracing apparatus according to the prior art is complicated, expensive to manufacture, and permits only a low working speed.

SUMMARY OF THE INVENTION

It is one object of the invention to overcome the disadvantages of tracing apparatus according to the prior art, and to provide a power driven tracing apparatus capable of continuously tracing an endless track of a template.

Another object of the invention is to provide a tracing apparatus capable of tracing a complicated track of a template, including track portions of very small curvature.

In accordance with the invention, a tracing apparatus includes at least two interconnected parts, of which one part is constructed, arranged and driven to move relative to the other part at least with one degree of freedom, and wherein the other part is provided with a follower movable along the template and biased so that the follower is in engagement with the template in each of its positions while being connected with the means guided from the template and operating a tool or workpiece to move in accordance with the shape of the template. The first part is constrained to move along a predetermined path, and the second part is mounted on the first part to perform either a linear, or an angular movement.

In accordance with the invention, a non-circular endless control track means is provided forming a predetermined path and being engaged by the first tracing means, which may include a follower roller mounted on a shaft, so that the roller and the shaft move along the predetermined path, carrying the second tracing means for the template track.

In another embodiment, the drive means include an arm rotated about an axis, and the first tracing means include a slide mounted on the arm for movement with the same and also for movement relative to the same, and supporting the second tracing means for angular movement. The second tracing means preferably includes a tracing lever having a follower engaging the track of the template, and being biased to turn on the support means in such a direction that the follower thereon is urged in the desired direction into engagement with the track of the template.

In the embodiments in which the first tracing means is guided along an endless control cam track, it is advantageous to construct the control cam track of two control cam track members, and to mount one of the same resiliently so as to assure accurate guidance of the second tracing means, for example, a wheel means, along the control track.

If the track of the templates deviates only little from a circle, for example, for making a heart cam, the embodiment of the invention in which a support arm is rotated, and carries either a slide or a tracing lever, is sufficiently accurate, since the movement of the tracing slide or tracing lever follows the small deviations of the track of the template from the circular path of the support arm.

If the track of the template has a more complicated shape, oblong and substantially deviating from a circular path, it is advantageous to provide corresponding oval endless control track means for guiding the first tracing means, which support the second tracing means for relative movement, so that the follower of the second tracing means can accurately follow track portions of the template of small curvature deviating from the endless oval control track means.

The same result can be obtained, if a slide, movably mounted on a rotating supporting arm is provided with a follower guided along an oblong control track, and movably carries a biased tracing means cooperating with the track of the template.

The novel features which are considered as characteristic for the invention are set forth in particular in the appended claims. The invention itself, however, both as to is construction and its method of operation, together with additional objects and advantages thereof, will be best understood from the following description of specific embodiments when read in connection with the accompanying schematic drawings.

BRIEF DESCRIPTION OF THE DRAWING

FIG. 5 is a fragmentary sectional view along line V—V in FIG. 3, as viewed in the direction of the arrows;

FIG. 6 is a schematic view illustrating a template and a control track whose outline corresponds substantially to the simplified shape of the track of a template;

FIG. 7 is a fragmentary schematic plan view illustrating a preferred embodiment in which a tracing slide mounted on a rotary tracing arm follows the control track, and turnably supports a biased tracing lever which engages the track of the template;

FIG. 8 is a fragmentary schematic side elevation of the embodiment of FIG. 7;

DESCRIPTION OF THE PREFERRED EMBODIMENTS

The embodiments shown in FIGS. 1, 2 and FIGS. 3, 4, 5 are not objects of the present invention, but will be described for facilitating the understanding of the preferred embodiments of FIGS. 7, 8 and FIGS. 9, 10.

Figure 1:
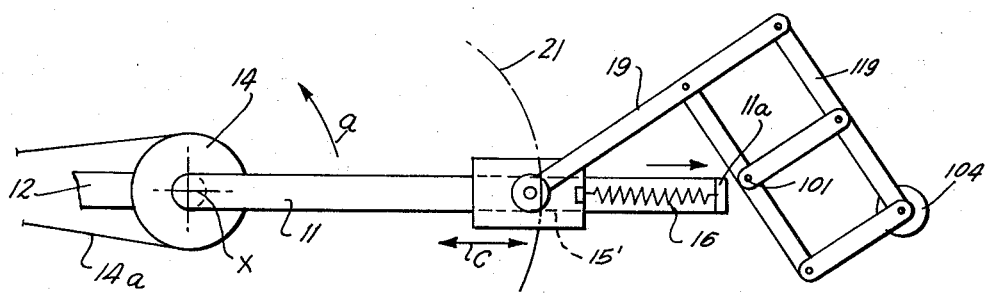
FIG. 1 is a fragmentary schematic plan view illustrating a first apparatus in which a tracing means performs a linear movement relative to its rotary supporting means.
Figure 2:
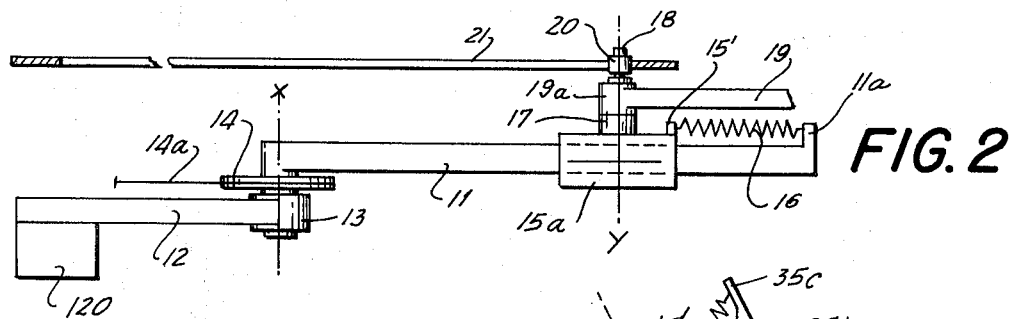
FIG. 2 is a fragmentary schematic side elevation of the apparatus shown in FIG. 1.

Referring first to FIGS. 1 and 2, a stationary frame arm 12 supported at 120, has a bearing 13 in which a transverse shaft portion of a supporting arm 11 is mounted for rotation about the axis $x$ perpendicularly projecting from the same. A pulley 14 is secured to the transverse shaft portion of support arm 11, and is driven by a belt 14a from a motor, not shown, to rotate in the counterclockwise direction indicated by the arrow $a$. Other reduction transmission means may be substituted for the pulley transmission.

A slide 15 is mounted on support arm 11 for reciprocating movement in the direction of the double arrow $c$ in radial direction in relation to the axis $x$, and longitudinally of supporting arm 11. Supporting arm 11 may have, for example, a hexagonal profile, on which slide 15 slides with a matching hexagonal bore 15a. A spring 16 is secured to the lug 11a on the free end of support arm 11, and at the other end to the slide 15 so that the same is biased to move in the direction of the arrow $b$ in FIG. 1.

The top of slide 15 carries a short column 17 which is continued in a fixed shaft 18 on which a guided means 19, for example, the feeler lever 19 of a pantographic device 11a, is mounted for angular movement by means of a ball bearing 19a. A portion of shaft 18 projecting beyond ball bearing 19a supports a follower roller 20 which is mounted on shaft 18 by means of a ball bearing so that the guided arm 19 can turn about the shaft 18. Roller 20, which engages the track of template 21 due to the biasing action of spring 16, has a diameter selected in accordance with the curvatures and size of the track of template 21. Roller 20 and the guided arm 19 are turnable about the same axis $y$ since they are both mounted on shaft 18.

In the illustrated embodiment, the template 21 is mounted above the tracing apparatus, and follower roller 20 engages an inner endless track of template 21, which is shown in FIG. 1 as a dash-dot line for the sake of simplicity. As shown in FIG. 2, the elements 11, 15, 16, 17, 19 are all located above the fixed frame arm 12 and pulley 14 so that arm 11 can freely rotate between frame arm 12 and the template 21 while follower roller 20 moves along the track of the template 21. Frame arm 12 is fixed to a support bracket 120, and carries the entire bracing device.

The embodiment of FIGS. 1 and 2 is operated in the following manner:

When pulley 14 is turned one revolution of 360° by the motor, not shown, support arm 11 is turned 360°. Slide 15 is urged by spring 16 toward the free end of support arm 11 and engages with follower roller 20 the inner track of template 21 which has any desired non-circular shape, deviating from a circular shape. However, the embodiment of FIGS. 1 and 2 is best used with templates 21 whose non-circular track does not substantially deviate from a circular line, such as are used for making a heart cam, or a circular cam having a lug. Since during rotation of support arm 11 follower roller 20 is moved along the endless non-circular track of the template 21, slide 15 is moved by the track longitudinally of support arm 11 toward and away from the axis $x$ so that roller 20 having axis $y$ follows all portions of the track of the template 21. Since the inner end of the guided arm 19 is coaxial with roller 20, guided arm 19 performs a motion parallel to the track of the template so that roller 20 is not only the feeler for slide 15, but also for the guided arm 19. The guided arm 19 is part of a pantograph device 119 which is mounted on a fixed pivot 104 and carries a rotary tool 101 performing the same movements as guided arm 19 so that a workpiece is milled along an edge having the contour of the track of template 21.

Slide 15 with roller 20 is a tracing means mounted on the supporting means 11 for movement therewith, and also for radial movement relative thereto, and the tracing means 15, 20 is biased to engage the track of the template 21 with the guided means 19.

Figure 3:
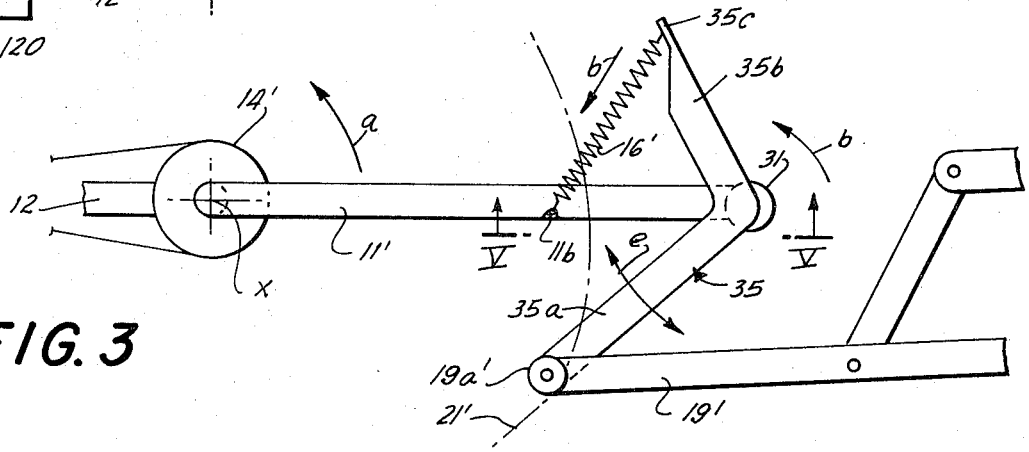
FIG. 3 is a fragmentary schematic plan view of a second apparatus in which a tracing means performs an angular movement relative to rotary supporting means.
Figure 4:
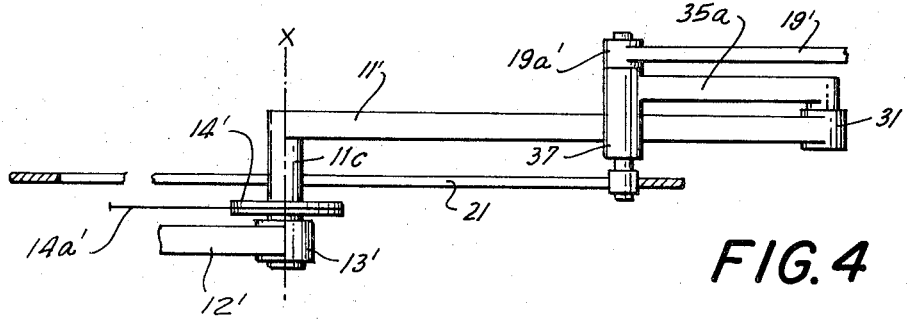
FIG. 4 is a fragmentary schematic side elevation of the embodiment of FIG. 3.

Referring now to the embodiment illustrated in FIGS. 3, 4 and 5, in which parts corresponding to FIGS. 1 and 2 are indicated by primed reference numerals, a supporting drive arm 11' is mounted on frame arm 12' by means of a shaft portion 11c in a bearing 13', and is rotated by a pulley 14' about the axis $x$, and carries at its free end a bearing 31 in which a transverse journal portion of an angular tracing lever 35 is mounted. A spring 16 connects the point 11b of support arm 11' with the end portion 35c of the arm 35b of tracing lever 35, whose other arm 35a has a shaft portion 37 at the free end thereof on which the end of a guided arm 19 is mounted by means of a ball bearing 19a'. At the other end of shaft 37, a follower roller 20' is mounted for rotation by means of a ball bearing so that guided arm 19' and roller 20' turn about a common axis $y$. Follower roller 20' is in contact with the inner track of template 21' due to the action of spring 16' which urges arm 35b to move in the direction of the arrow $b$ so that angular tracing lever 35 turns in the direction of the arrow $d$. The transverse shaft portion 11c of supporting arm 11' is long enough so that pulley 14' and supporting bracket arm 12' are located below the lower end of shaft 37 and follower roller 20' so that the pulley 14' and belt 14a' do not interfere with support arm 11' during the revolution of the same since , 37, 11',37, 35a, 19' are located above the template 21' and frame arm 12' below the template. Shaft portion 11c passes through the annular template while follower roller 20' engages track 21'.

During an operation, supporting drive arm 11' performs one revolution, while follower roller 20' follows the track of template 21'. The arm 19' moves with follower roller 20' and controls the workpiece or tool 101 in accordance with the shape of the track of template 21' while angular tracing lever 35 turns in the direction of the double arrow $e$. In this manner, the deviations of the template from the basically circular path of the pivot point 31 of the angular tracing lever 35 are compensated by the angular movement of the tracing lever 35.

In the illustrated construction of FIGS. 3, 4 and 5, tracing lever 35 can perform angular movements of about 90°. Consequently, the device is limited for use with templates whose tracks do not deviate very much from the circular shape.

If instead of the inner track of an annular template, the outer track of an annular template is to be traced, the spring 16' is connected to arm 35a, and arm 35b of tracing lever 35 can be omitted, now shown.

As noted above, the above described devices of FIGS. 1 to 4 are particularly suited for the production of workpieces which do not substantially deviate from a circular shape, such as a mainly circular cam having a lug for operating an electric switch, or a heart cam. However, if an oblong template with a complicated outline is to be traced, the embodiment of FIGS. 1 and 2 is not well suited, since this requires a very long support arm 11, so that the slide 15 must make very great radial movements where the track of the template has substantially greater or substantially smaller radius of curvature than the circular path along which slide 15 is moved by the rotating support arm 11. Also, the embodiment of FIGS. 1 and 2 cannot be used if the template has such a shape that the middle portion thereof located in the same plane as the axis $x$ of support arm 11, is very narrow so that there is no room for slide 15 to move toward the axis $x$.

For the embodiment of FIGS. 3 to 5, similar considerations are valid particularly if the angle of movement of the tracing lever 35 is required to be very great due to the deviation of the traced track of the template 21' from the circular path of the end of support arm 11'. Difficulties arise when the track of the template 21' has a very sharp change of direction which requires a particularly long tracing lever which has to be moved in a direction in which the follower roller 20' is biased transversely to the track of the template toward the same, instead of being guided in tangential direction along the track of the template 21'.

In order to overcome these drawbacks, the present invention provides the apparatus shown in FIGS. 6–8, in which the tracing lever is not directly mounted on a rotating support arm, but mounted on a slide which is movable on the support arm, and guided along a control track which has substantially the general outline of the complicated template track, portions of which substantially deviate from the control track.

FIG. 6 shows a template track 21' of a template 21a for producing a workpiece, such as a spectacle frame, having a rather complicated shape, and substantial transverse deviations from an endless oblong general outline of a control cam track 41 which extends around template track 21''. A circular movement as provided by the embodiments of FIGS. 1 to 5 would require extremely great radial movements of the tracing slide 15 or tracing lever 35, particularly at the bridge portion of the spectacle frame. Therefore, on a template 41a, an endless oblong control track 41 is provided whose shape corresponds to the general outline of the template track 21'' since it is necessary to move the tracing means, for example, a lever corresponding to the tracing lever 35, on the control track 41 along a path having the general outline of the track 21'' of the template 21, but omitting the recessed portions. In all positions of the apparatus, the turning axis of the tracing lever is located in the predetermined path provided by the control track 41. In such an arrangement, it is possible to make the tracing lever very short, and to limit its angular displacement to small angles.

The apparatus of FIGS. 7 and 8 embodies this principle. As in the embodiment of FIGS. 1 and 2, the support and drive arm 11 which is mounted with shaft portion 11c in the bearing 13 of the fixed frame arm 12, is rotatable about the axis $x$, and is driven by the pulley 14 in the direction of the arrow $a$ so that each of its portions moves along a circle.

A tracing slide 45 is mounted on support arm 11 for radial reciprocating movement toward and away from axis $x$ and is biased by a spring 16 in the direction of the arrow $b$. Slide 45 carries an upwardly projecting fixed shaft portion 18 on which a follower roller 20''' of first tracing means is mounted for rotation by means of a ball bearing. Follower roller 20''' engages the control track 41 of the control track means 41a which is located above support arm 11, as shown in FIG. 8. For the sake of simplicity and clarity, the control track 41 is indicated in chain lines in FIG. 7.

Coaxial with the shaft portion 18, but below the slide 45, a journal 47 is provided on which the tracing lever 55 is mounted by means of a ball bearing 51 for angular movement about the axis $z$. The arrangement is such that tracing lever 55 and follower roller 20''' turn about a common imaginary axis $z$ so that follower roller 20''' determines the path of the turning axis of tracing lever 55 in accordance with the outline of the control track 41. Elements 11, 45, 55, 19'' are located between control track means 41a, 41 and the template 21a, 21'', as best seen in FIG. 8, and can freely rotate about axis $x$ while follower rollers 20'' and 20''' move along tracks 41 and 21''. The fixed frame arm 12 is located above template 41a, and supports all tracing elements, while shaft 11c passes through the annular control track means 41a.

The embodiment of FIGS. 7 and 8 operates as follows:

When support arm 11 is rotated by drive pulley 14 in the direction of the arrow $a$, the support arm portion 11 carrying slide 45 moves first tracing means 45, 20''' along a circle. Supporting slide 45 is guided by follower roller 20''' along the control track 41 so that the shaft portion 47 which carries second tracing means including the tracing lever 55 and follower 20'', moves about a predetermined path. This path is formed by control track 41, which has the general outline of the track 21'' of the template 21a, omitting projections and recesses of track 21'', and deviates nowhere a very great distance from track 21''. Spring 46 biases tracing lever 55 with follower roller 20'' toward the complicated track 21'' of the template 21a, see FIG. 6, so that the transverse deviations of template track 21'' from the control track 41 are compensated by angular movement of tracing lever 55, and the guided arm 19 is moved along a path corresponding to the outline of the template track 21'' for controlling a tool or workpiece accordingly.

It will be noted that the embodiment of FIGS. 7 and 8 is a combination of the embodiments of FIGS. 1 and 3. The tracing lever 35 of the embodiment of FIG. 3 is used as a tracing lever 55 in the embodiment of FIGS. 7 and 8, but is not mounted on the rotating supporting means 11', but on the slide 45. While in the embodiment of FIG. 3 only the tracing lever 35 is guided about the track of the template 21, in the embodiment of FIGS. 7 and 8, the tracing lever 55 is guided on the template track 21'', as before, but additionally, the slide 45 is guided along a control track 41. As a result, the second tracing means 55, 20'' is not guided along a circular path as in the embodiments of FIGS. 1 and 3, but along a non-circular path 41 whose outline corresponds generally to the outline of the more complicated track 21'' of the template 21a.

In the embodiment illustrated in FIGS. 7 and 8, the support arm 11 is disposed below the bearing 13 and the supporting bracket 12. Shaft portion 11c of support arm 11 is of such a length that the control track means 41 is located below the bearing 13 so that shaft portion 18 can pass under the fixed support arm 12 without being obstructed. The other parts of the tracing apparatus are disposed so that the template 21a is located below the tracing lever 55 and the guided means 19'', permitting follower roller 20'' to move along the track 21'' of template 21a. The several bearings described above must be constructed in accordance with this arrangement of the parts.

In the embodiment of FIGS. 7 and 8, the torsion spring 46 is provided for urging the second tracing means 55, 20'' into engagement with the outer endless track 21'' of template 21. By differently arranging spring 46, the endless inner track of an annular template, not shown, can be traced by follower roller 20''.

As illustrated in FIGS. 7 and 8, follower roller 20''' of support slide 45 of the first tracing means 45, 20''' moves along an endless inner control track 41. In a further modification, not shown, and similar to FIG. 9, spring 16 is omitted, and follower roller 20''' moves in an endless control cam groove 41 so that the supporting slide or carriage 45 is forced to perform a movement in the direction of the arrow c along support member 11.

In all embodiments of the invention, the biasing means of the tracing means or support slide need not necessarily be springs, since pneumatic, hydraulic or pneumatic cylinder and piston devices can be used.

In the above-described embodiments, particularly the embodiment in which the second tracing means includes a biased lever, it may happen that during the uniform motion of the fulcrum of the tracing lever 55 along a predetermined non-circular path, the tracing lever 55 itself must move very great angles. In order to assure under such circumstances a perfect tracing of the track of the template, it is advantageous to reduce the speed of movement of the tracing means at portions of the track where large angular movements are required of the tracing lever. For example, the vertical shaft portion 11c of the rotary supporting arm 11 may be provided with a circular disc, not shown, provided with cutouts passing a photocell and corresponding source of light for generating control signals which are transmitted after amplification to regulating means of the drive motor of pulley 14 so that at certain track portions the speed of supporting means 11 is reduced to afford more time for the great angular movements of the tracing lever at the respective track portions.

Figure 9:
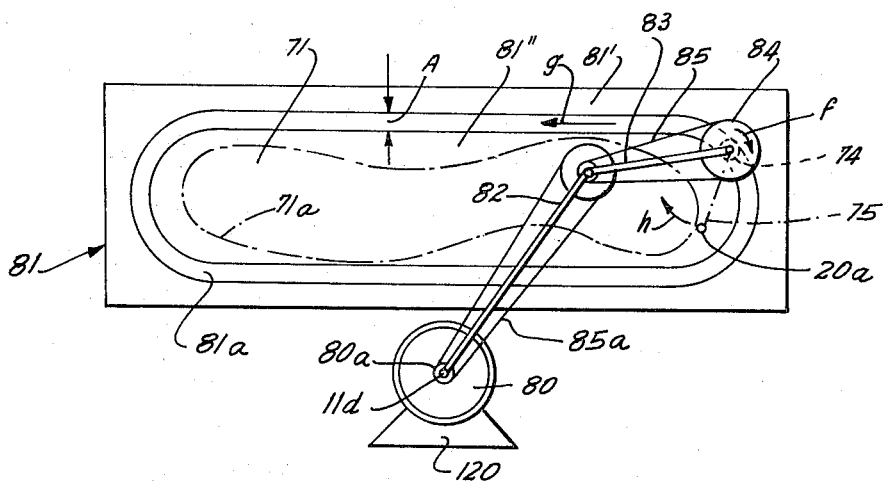
FIG. 9 is a schematic plan view illustrating an other embodiment of the invention in which the tracing means include a wheel rolling along a control track.
Figure 10:
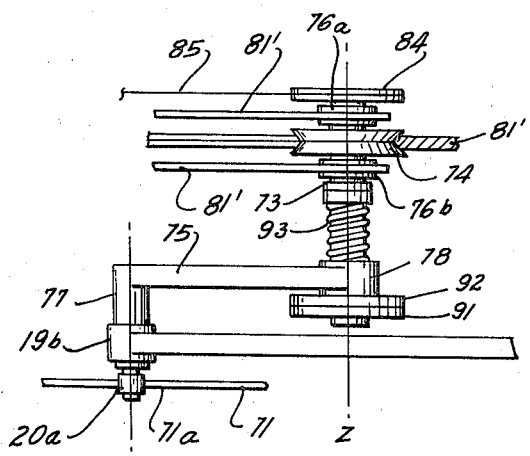
FIG. 10 is a fragmentary schematic side elevation of the embodiment of FIG. 9.

In the embodiment of FIGS. 9 and 10, a supporting arm rotating about a fixed axis is not used. The first tracing means are supported on a supporting means 84 guided along an oblong endless control track 81a of a control track means 81 whose general outline corresponds to the outline of the track 71a of the template 71. A friction wheel 74 having an annular triangular peripheral groove engages the correspondingly shaped inner edge of an outer control track member 81' which, together with inner control track members 81'' and their outer endless edges, forms the control track 81a having the width A. The friction wheel 74 has a shaft mounted in bearings of a toggle lever 83 which is articulated with another toggle lever 82. An electromotor 80 whose casing is supported on the machine frame 120, drives over a pulley 80a on lever 82 and a belt 84, another pulley and belt drive 85 by which a drive pulley 84 connected by shaft 73 with friction wheel 74 is driven for driving friction wheel 74. A transverse shaft portion 11d of lever 82, coaxial with the motor 80, is supported on a support arm, not shown, corresponding to the fixed support arm 12' described in the reference to FIG. 4, so that the tracing apparatus is supported for movement above template 71. Consequently, the rotating friction wheel 74 rolls along the inner friction edge of the outer endless control track member 81' in the direction of the arrow g when friction wheel 74 rotates in the direction of the arrow f. During the movement of friction wheel 74, which is part of first tracing means 74, 76a, 76b, 73, along the control track 81a, the toggle levers 82 and 83 assume different angular positions in accordance with the distance of the control track portion, where wheel 74 is located, from the shaft of motor 80. At the same time, tracing lever 75 of second tracing means 75, 20a turns about shaft 73 of the first tracing means while being in contact with the track 71a of template 71.

While FIG. 9 is drawn to a smaller scale, the scale of FIG. 10 corresponds to the scale of FIGS. 1 to 8. Friction wheel 74 is fixedly carried by shaft 73 to whose upper end, pulley 84 is secured. The inner endless edge of control track 81' fits exactly into the triangular annular groove in friction wheel 74, while the outer endless edges of control track members 81'' are spaced from the periphery of the friction wheel 74. Control track members 81'' are plates 81'' having parallel outer endless edges which are axially displaced to the inner endless edge of control track member 81' and are respectively engaged by a pair of rollers 76a and 76b, arranged on opposite sides of friction wheel 74 on shaft 73. The inner control track plates 81'' are fixedly secured to each other and form a control track member which is mounted on resilient pins, not shown, which permit a resilient displacement of both control track plates. The arrangement of the control track plates 18' and 81'' is such that when the friction wheel 74 and the rollers 76a and 76b, which form a first tracing means, are not located in the control track, the width A of the control track is slightly less than the transverse dimension of the supporting means 74, 76a, 76b so that when the same is placed in the control track, the control track plates 81'' are resiliently displaced whereby the rollers 76a and 76b press the friction wheel 74 against the inner endless edge of outer control track member 81' without exerting a tilting moment on the same.

Shaft 73 which is thus guided along an endless track or path 81a corresponding to the simplified shape of the template track 71a, has a friction clutch 91, 92 at its lower end whose clutch member 91 is fixedly secured to driven shaft 73, while clutch member 92 is fixedly secured with the tracing lever 75. Bearing 78 of tracing lever 75 is biased by spring 93 downward so that clutch parts 91 and 92 are pressed together to create the necessary friction for biasing tracing lever 75 to turn about the axis Z by means of a ball bearing 78 surrounding a portion of shaft 73.

Tracing lever 75 has a downwardly directed shaft portion 77 on which the follower roller 20a is rotatably mounted. The guided arm 19, which carries a tool or a workpiece, is connected with shaft portion 77 by ball bearing 19b which has a common axis y with follower roller 20a biased with tracing lever 75, 77 due to the transmission of a friction torque from the driven coupling part 91 to coupling part 92 which is secured to tracing lever 75.

During the operation of the apparatus, the motor 80 drives friction wheel 74 so that the same rolls along the inner edge of control track member 81' while the rollers 76a and 76b press the plates of control track member 81'' slightly away from the inner edge of control track member 81' which is possible due to the fact that control track member 81'' is mounted on resilient pins, not shown. A strong pressure is exerted on rollers 76a and 76b which press the friction roll 74 into frictional engagement with the endless inner edge of outer control track member 81', so that the friction required for the rolling of friction wheel 74 along track member 81' is obtained. Rollers 76a and 76b roll practically without friction on the outer endless edges of the control track plates 81''. Friction wheel 74 moves with shaft 73 along the predetermined path defined by the control track 81a of control track means 81, so that tracing lever 75 moves about this predetermined path while being biassed through the friction clutch 91, 92 toward the track 71 of the template 71a so that the follower roller 20a moves the guided means 19 along the track 71 of the template 71a. The folding expanding and contracting toggle levers 82 and 83 permit friction wheel 74 of the first tracing means to follow the control track 81a, 81', 81'' while the angular movements of tracing lever 75 of the second tracing means 75, 77, 20a take care of the deviations of the track 71 of the template 71a from the control track 81', 81''.

Instead of the above-described friction wheel 74, a gear may be used which meshes with rack teeth along the edge of one of the control track members. In this event, it is not necessary to provide a resilient support for one of the control track plates 81', 81''.

The embodiment can be modified by providing a wheel 74 which rolls on the outer endless edge of the inner control track member 81'', in which event the outer control track member 81' is constructed of two plates engaging the rollers 76a and 76b.

If the tracing lever 75 has to perform very great angular movements due to the shape of one or several parts of the track 71 of the template, it is advantageous to reduce the speed at which the wheel 74 moves along the control track while follower roller 20a engages the respective portion of the track 71 of the template. Wheel 74 may be provided with a screen, not shown, which interrupts a beam from a source light to a photocell, whereby a signal is generated which can be amplified and used for reducing the speed of motor 80 by regulating means.

As shown in FIG. 1, in all tracing apparatus of the invention, the guided means 19 may be the feeler lever of a pantographic device 119 with a fixed pivot 104 and serving for guiding a tool, such as a milling cutter 101, along a path corresponding to the track of the template, but being enlarged or reduced in size. However, it is also possible to connect a tool directly to the guided means 19 or 19''. It is also possible to provide a stationary tool, and to move the workpiece along a path determined by the template, for example, by means of an easily movable cross support.

It will be understood that each of the elements described above, or two or more together, may also find a useful application in other types of tracing apparatus differing from the types described above.

While the invention has been illustrated and described as embodied in a tracing apparatus having two non-circular tracks and two tracing means, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A tracing apparatus comprising non-circular control track means having a control track; first tracing means movable along a predetermined path defined by said control track; drive means for moving said first tracing means along said predetermined path; a template having a non-circular track extending along said path but at least partly deviating therefrom; second tracing means mounted on said first tracing means for movement therewith along said predetermined path, and also for movement relative to said first tracing means, said second tracing means engaging said track of said template so that said second tracing means moves relative to said first tracing means at least where said track of said template deviates from said path; and guided means connected with said second tracing means for movement therewith and being guided by the same to move in accordance with the shape of said track of said template.

2. Tracing apparatus as claimed in claim 1, wherein said drive means include a supporting means rotatable about an axis, said first tracing means being mounted on said supporting means for movement with the same and also for movement relative to the same, said first tracing means engaging said control track for movement along said path.

3. Tracing apparatus as claimed in claim 2, wherein said supporting means includes a rotary support arm extending in radial direction; wherein said first tracing means includes a slide mounted on said support arm for radial movement relative to the same, and a first follower engaging said control track of said control track means; wherein said second tracing means include a tracing lever mounted on said slide for angular movement, a second follower on said tracing lever, and biasing means for biasing said tracing lever so that said second follower engages said track of said template; and wherein said guide means is articulated to said slide 4. Tracing apparatus as claimed in claim 1, wherein said control track is endless and non-circular.

5. Tracing apparatus as claimed in claim 1, wherein said control track means include an outer control track member having endless non-circular inner edge and an inner control track member having an endless non-circular outer edge substantially uniformly spaced from said inner edge and forming with the same an endless control track forming said predetermined path; wherein said first tracing means include a shaft and wheel means mounted on said shaft and located in said control track engaging one of said endless edges, and being rotated by said drive means to roll along said one edge along said predetermined path; and wherein said second tracing means is mounted on said shaft of said wheel means for angular movement about said shaft relative to said wheel means.

6. Tracing apparatus as claimed in claim 5, wherein said wheel means includes a friction wheel in rolling frictional engagement with said one endless edge so as to move said first tracing means along said control track.

7. Tracing apparatus as claimed in claim 5, wherein one of said control track members has one endless edge; wherein the other control track member has a pair of parallel other endless edges; and wherein said wheel means include a wheel engaging said one endless edge, and a pair of coaxial rollers rolling on said other endless edges, respectively.

8. Tracing apparatus as claimed in claim 5, wherein said wheel means is fixed to said shaft for rotation therewith; wherein said second tracing means include a tracing lever mounted on said shaft for angular movement and having a follower, and a friction clutch connecting said shaft with said tracing lever so that said tracing lever is driven by said friction clutch to urge said follower into engagement with said track of said template.

* * * * *